(12) United States Patent
Takahashi et al.

(10) Patent No.: US 6,707,276 B2
(45) Date of Patent: Mar. 16, 2004

(54) VOLTAGE REGULATOR OF AC GENERATOR HAVING CIRCUIT FOR DETECTING VOLTAGE INDUCED IN FIELD COIL

(75) Inventors: Keiji Takahashi, Kariya (JP); Toshinori Maruyama, Anjo (JP); Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 56 days.

(21) Appl. No.: 09/885,163

(22) Filed: Jun. 21, 2001

(65) Prior Publication Data

US 2002/0030470 A1 Mar. 14, 2002

(30) Foreign Application Priority Data

Jun. 26, 2000 (JP) .......................... 2000-191739
Jul. 12, 2000 (JP) .......................... 2000-211706
May 17, 2001 (JP) .......................... 2001-148244

(51) Int. Cl.$^7$ .................. H02P 9/02; H02P 13/06; H02P 11/00; H02P 9/00; H02H 7/06
(52) U.S. Cl. ............................. 322/28; 322/17
(58) Field of Search ..................... 322/28, 17, 29

(56) References Cited

U.S. PATENT DOCUMENTS

| | | | |
|---|---|---|---|
| 4,143,289 A | | 3/1979 | Williams ................ 310/156 |
| 4,152,636 A | * | 5/1979 | Gorden .................. 322/25 |
| 4,297,631 A | | 10/1981 | Nicol et al. .............. 320/64 |
| 4,355,276 A | * | 10/1982 | Vittay .................... 322/4 |
| 4,973,896 A | * | 11/1990 | Shiga et al. .............. 322/28 |
| 5,130,590 A | * | 7/1992 | Sugiura .................. 310/114 |
| 5,144,178 A | * | 9/1992 | Sugiura .................. 310/114 |
| 5,170,111 A | * | 12/1992 | Sugiura .................. 322/29 |
| 5,182,511 A | | 1/1993 | Pierret et al. ........ 324/158 MG |
| 5,363,032 A | * | 11/1994 | Hanson et al. ............. 322/10 |
| 5,376,876 A | | 12/1994 | Bauser et al. ............. 322/28 |
| 5,493,200 A | * | 2/1996 | Rozman et al. ............ 322/10 |
| 5,493,202 A | | 2/1996 | Iwatani et al. ............ 322/28 |
| 5,502,368 A | * | 3/1996 | Syverson et al. .......... 322/28 |
| 5,602,470 A | | 2/1997 | Kohl et al. .............. 324/177 |
| 5,631,544 A | * | 5/1997 | Syverson et al. .......... 322/46 |
| 5,656,922 A | * | 8/1997 | LaVelle et al. ........... 322/46 |
| 5,663,631 A | * | 9/1997 | Kajiura et al. ........... 322/29 |
| 5,672,952 A | | 9/1997 | Szepesi .................. 320/25 |
| 5,693,995 A | * | 12/1997 | Syverson ................. 310/114 |
| 5,710,471 A | * | 1/1998 | Syverson et al. .......... 310/114 |
| 5,747,909 A | * | 5/1998 | Syverson et al. .......... 310/156 |
| 5,753,989 A | * | 5/1998 | Syverson et al. .......... 310/114 |
| 5,850,138 A | * | 12/1998 | Adams et al. ............. 322/68 |
| 6,037,753 A | * | 3/2000 | Uematsu et al. ........... 322/29 |
| 6,043,632 A | * | 3/2000 | Maehara et al. ........... 322/28 |
| 6,111,390 A | * | 8/2000 | Inaba et al. ............. 322/28 |
| 6,236,134 B1 | * | 5/2001 | Syverson ................. 310/181 |
| 6,380,718 B1 | * | 4/2002 | Davis, Jr. et al. ........ 322/28 |
| 6,486,640 B2 | * | 11/2002 | Adams .................... 322/59 |
| 6,541,943 B1 | * | 4/2003 | Wylie et al. ............. 322/28 |
| 6,555,992 B2 | * | 4/2003 | Asao et al. .............. 322/28 |

FOREIGN PATENT DOCUMENTS

| | | |
|---|---|---|
| EP | 665 637 A1 | 8/1995 |
| JP | 5083998 | 4/1993 |
| JP | 06-276796 | 9/1994 |
| JP | 06-284598 | 10/1994 |

* cited by examiner

*Primary Examiner*—Nestor Ramirez
*Assistant Examiner*—Pedro J. Cuevas
(74) *Attorney, Agent, or Firm*—Oliff & Berridge, PLC

(57) ABSTRACT

A voltage regulator of a vehicle AC generator is comprised of a field current switching circuit connected to a field coil, a control circuit for controlling the field current switching circuit according to an output voltage of the armature coil; a power circuit for supplying electric power to the control circuit, a power drive circuit for controlling supply of electric power of the power circuit to the control circuit, and a rotation speed sensor. The power drive circuit supplies electric power from the power circuit to the control circuit if the rotation speed becomes as high as a predetermined speed.

8 Claims, 13 Drawing Sheets

VOLTAGE REGULATOR OF AC GENERATOR HAVING CIRCUIT FOR DETECTING VOLTAGE INDUCED IN FIELD COIL

CROSS REFERENCE TO RELATED APPLICATION

This application is based on and claims priority from Japanese Patent Applications: 2000-191739 filed Jun. 26, 2000; 2000-211706, filed Jul. 12, 2000, and 2001-148244, filed May 17, 2001, the contents of which are incorporated herein by reference.

BACKGROUND OF THE INVENTION

1. Field of the Invention

The present invention relates to a voltage regulator of a vehicle AC generator.

2. Description of the Related Art

JP-A-6-276796 discloses a self-excited vehicle AC generator in which field current is supplied to a field coil when a phase voltage or a neutral point voltage of an armature coil becomes higher than a predetermined level. The phase voltage or the neutral point voltage, which is AC voltage, is directly applied to a first comparator of a voltage regulator to start intermittent generation. Thereafter, if the phase voltage becomes higher as the rotation speed of the AC generator increases, the phase voltage is applied to a second comparator through a rectifier to start regular generation.

JP-A-3-215200 or its corresponding U.S. Pat. No. 5,182,511, and PCT national publication 8-503308 or its corresponding U.S. Pat. No. 5,602,470 disclose a circuit that includes a differential amplifier connected to two phase-windings of the armature coil to detect the self-excited voltage even if leak current flows into the armature coil.

However, installation of the differential amplifier may increase the cost and man-hour for manufacturing the AC generator. If leak current flows into the armature coil when the AC generator stops, the above-described arrangement may erroneously recognize a voltage caused by the leak current as the self-excited voltage and supply field current to the field coil. This causes serious battery discharge.

Some of the above publications disclose a bypass resistor connecting a phase-winding and a ground to bypass such leak current to the ground.

However, such a bypass resistor may cause harmful heat generation and useless power consumption.

Each of JP-A-3-215200, JP-A-6-284598 and PCT International Publication 8-503308 discloses a signal detection circuit that detects and amplifies a voltage difference between two phase-coils. This detection circuit can correctly detect the generation start signal even if leak current flows into the armature coil.

However, such a signal detection circuit necessitates complicated wiring arrangement in the AC generator, thereby increasing parts and man-hour for manufacturing the AC generator.

SUMMARY OF THE INVENTION

Therefore, a main object of the invention is to provide an improved voltage regulator of a vehicle AC generator that is free from the above-stated problem and simple in construction.

A voltage regulator of a vehicle AC generator according to a feature of the invention includes a switching circuit for supplying field current to the field coil of the AC generator in a controlled manner, a field voltage detecting circuit for detecting field voltage induced in the field coil when the field coil is not supplied with field current, and a switch control circuit for controlling the switching circuit according to said field voltage.

Therefore, the switching circuit can be controlled according to operation of the AC generator with a simple structure arrangement and without trouble of leak current flowing in the armature coil of the AC generator.

A voltage regulator of a vehicle AC generator according to another feature of the invention includes a field current switching circuit connected to the field coil of the AC generator, a control circuit for controlling a field current switching circuit according to an output voltage of said armature coil, a power circuit for supplying electric power to the control circuit, a power drive circuit for controlling supply of electric power from the power circuit to the control circuit and first means for detecting rotation speed of the AC generator. The power drive circuit supplies electric power to the control circuit if the rotation speed becomes as high as a predetermined speed.

This arrangement does not necessitate a bias resistor connected to a portion of the armature coil to detect a self-excited voltage induced in the armature core. Therefore, power loss caused by the bias resistor is eliminated.

The first means may be formed of a permanent-magnet-rotor fixed to the rotor of the AC generator and a pickup coil, and the power drive circuit may supply electric power to the control circuit for a predetermined duration after output voltage of the pickup coil becomes as high as a predetermined voltage.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
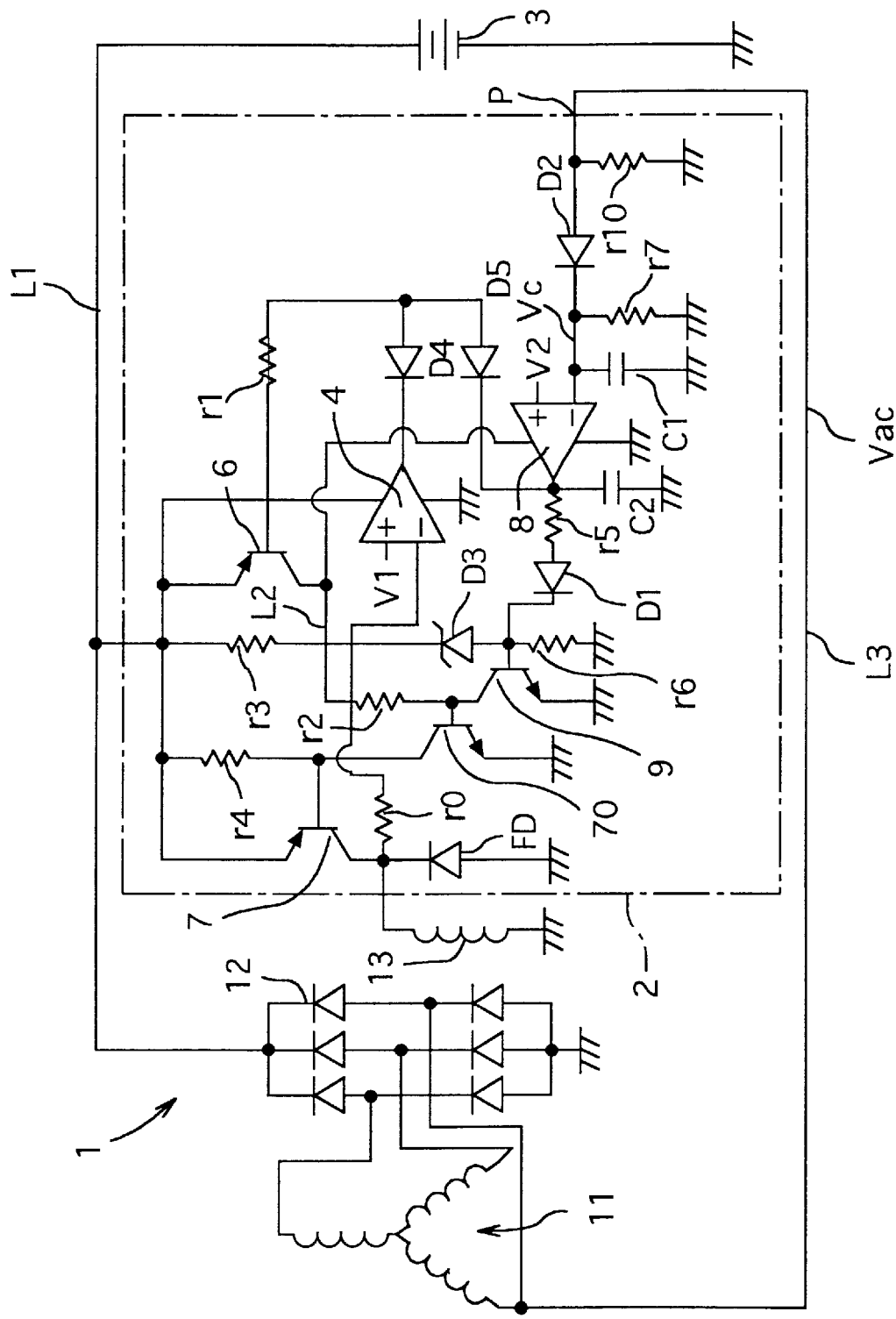
FIG. 1 is a circuit diagram of an AC generator that includes a voltage regulator according to a first embodiment of the invention.

A voltage regulator according to a first embodiment of the invention is described with reference to FIGS. 1, 3 and 4.

A vehicle AC generator 1 is so called an alternator that has a three-phase armature winding 11, a three-phase full-wave rectifier 12, a field coil 13. The armature coil 11 is mounted in a well-known stator core and the field coil is mounted in a well-known rotor. The armature coil 11 has three phase-windings, which are respectively connected to the rectifier 12 in a well-known manner. The voltages induced in the three phase-windings are rectified by the rectifier 12 and supplied to a battery 3 through a first power line L1. Field current is supplied to the field coil 13 from the first power line L1 through a switching transistor 7 of a voltage regulator 2.

The voltage regulator 2 according to the first embodiment is mainly comprised of a comparator 4, a transistor 6, the switching transistor 7, a pre-transistor 70 for the switching transistor 7, a flywheel diode FD, a comparator 8, an internal power line L2, a transistor 9, resistors r0–r7 and r10 and diodes D1–D5, which includes a Zener diode D3.

Voltage of a junction of the switching transistor 7 and the field coil 13 is applied to an input terminal of the comparator 4 through the resistor r0 to be compared with a reference voltage V1 that is applied to the other input terminal of the comparator 4. The reference voltage is less than 0.7 V, e.g. about 0.4 V in this embodiment.

Figure 3:
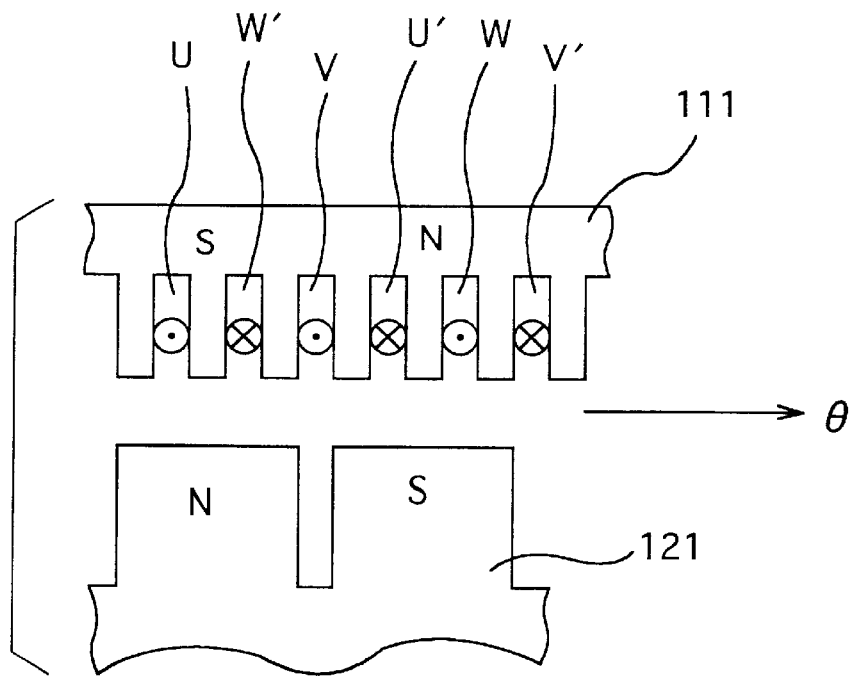
FIG. 3 is a schematic explanatory diagram of a portion of the AC generator shown in FIGS. 1 and 2.
Figure 4:
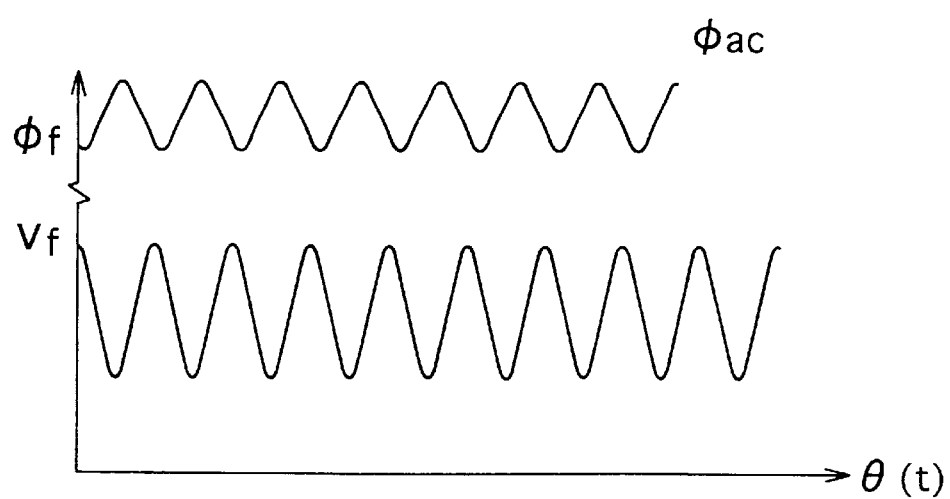
FIG. 4 is a timing chart showing relationship between residual flux and self-excited voltage.

When the AC generator is driven by an engine and is operated in a well-known manner, current flows in the three phase-windings U—U', V—V', and W—W' as shown in FIG. 3. It is known well that residual flux φf remains in the stator core, as indicated by characters N and S in FIG. 3, even after the AC generator stops operation. When the AC generator is, thereafter, driven by the engine, the rotor rotates in a direction θ and the pole pieces 121 of the rotor move relative to the phase-windings. As a result, an alternating flux φac crosses the field coil 13, and an AC voltage Vf (hereinafter referred to as the field-coil voltage) is induced in the field coil 13, as shown in FIG. 4.

If the field voltage Vf becomes higher than the voltage V1, such as 0.4 V, the comparator 4 is inverted to provide a low level signal (hereinafter referred to as Lo-signal) at the base of the transistor 6 via the diode D4 and the resistor r1, thereby, to turn on the transistor 6. In the meantime, the comparator 4 consumes little power while it is standing by. The comparator includes a pair of pnp transistors at the input stage thereof so as to be operated by an input signal that is as high as 0.4 V. When the transistor 6 is turned on, the potential of the internal power line L2 is raised to the potential level of the first power line L1. The raised internal power line L2 turns on the pre-transistor 70 via the resistor r2, which is a base current limiting resistor. Consequently, the switching transistor 7 is turned on. The transistor 9 is turned off at this stage. The resistor r4 is connected between the base and the emitter of the transistor 7 to stabilize the operation of the transistor 7.

When the switching transistor 7 is turned on, field current is supplied to the field coil 13 from the first power line L1, so that the AC generator starts regular generation.

If the rotor of the AC generator rotates at a low speed, the comparator 8 is powered by the internal power line L2. The positive input terminal of the comparator 8 is applied a voltage V2, such as 6 V. The output terminal of of the comparator 8 is grounded through the capacitor C2 and connected through the resistor r5 and the diode D1 to the base of the transistor 9. If the comparator 8 is powered to operate while the rotor is rotating at a low speed, the comparator 8 turns on the transistor 9 after a delay time decided by the capacitor C2 because the phase-voltage Vac of a phase-winding of armature coil 11 is lower than the voltage V2.

Because the collector of the transistor 9 is connected to the pre-transistor 70, the pre-transistor 70 turns off if the transistor 9 turns on. Consequently the switching transistor 7 turns off to cut supply of the field current to the field coil 13. The magnetic energy accumulated in the field coil 13 is discharged through the flywheel diode FD in the same direction as the field current has flowed. As a result, the input voltage of the comparator 4 becomes lower than the reference voltage V1, and the comparator 4 provides a high level signal (hereinafter referred to a Hi-signal) to turn off the transistor 6.

If the transistor 6 turns off, the power supplied to the comparator 4 is cut, and, consequently, the transistor 9 is turned off.

After the magnetic energy accumulated in the field coil 13 completely dissipated, the residual magnetic flux of the armature core crosses the field coil 13 to induce the field-coil voltage Vf. If the field-coil voltage Vf is higher than the reference voltage VI, the comparator 4 provides Lo-voltage at the output terminal thereof to turn on the transistor 6, as described before. This operation will repeat. It is some time preferable to have an analog delay circuit that is comprised of a capacitor and a resistor to adjust the cycle time of the above operation. If the rotor stops rotation, the switching transistor 7 will not turn on so that the battery can be prevented from discharging.

As the rotation speed of the rotor becomes higher, the phase-voltage Vac of the armature coil 11 increases. The phase-voltage Vac is rectified by the half-wave rectifying diode D2 and applied to a discharge circuit that is comprised of the capacitor C1 and the resistor r7 to provide a DC voltage Vc. If the DC voltage Vc becomes higher than the reference voltage V2, such as 6 V, the comparator 8 provides Lo-signal to turn on the transistor 6 via the diode D5, thereby preventing the transistor 9 from turning off.

After the DC voltage Vc becomes higher than the reference voltage V2, the pre-transistor 70 and the switching transistor 7 will not turn off. Therefore, field current is fully or 100% supplied to the field coil 13.

If the rotation speed of the rotor becomes too high to render the potential of the first power line L1 excessively high, the Zener diode D3 turns on to turn off the transistors 70 and 7. Thus, supply of the field current to the field coil 13 is cut so that the output voltage of the AC generator can be regulated.

If the rotation speed of the rotor decreases, and consequently, the DC voltage Dc corresponding to the phase-voltage Vac becomes lower than the reference voltage V2, the comparator 8 outputs Hi-signal to intermittently control the field current after the delay time decided by the capacitor C1 and the resistor r7.

Thereafter, the energy accumulated in the capacitor C1 discharges through the resistor r7. When the DC voltage Dc becomes lower than the reference voltage V2, the comparator 8 turns on the transistor 9, which turns off the transistors 70 and 7 to cut supply of the field current to the field coil 13.

Thus, the field current is supplied to the field coil 13 in a limited time after the Ac generator stops operation. This ensures the rotor to keep a sufficient amount of the residual magnetic flux, so that the field-coil voltage Vf can be utilized to detect the rotation speed of the AC generator.

The resistor r10 connected between the line LK3 and a ground is a bypass resistor that bypasses leak current flowing in the armature coil 11.

Figure 2:
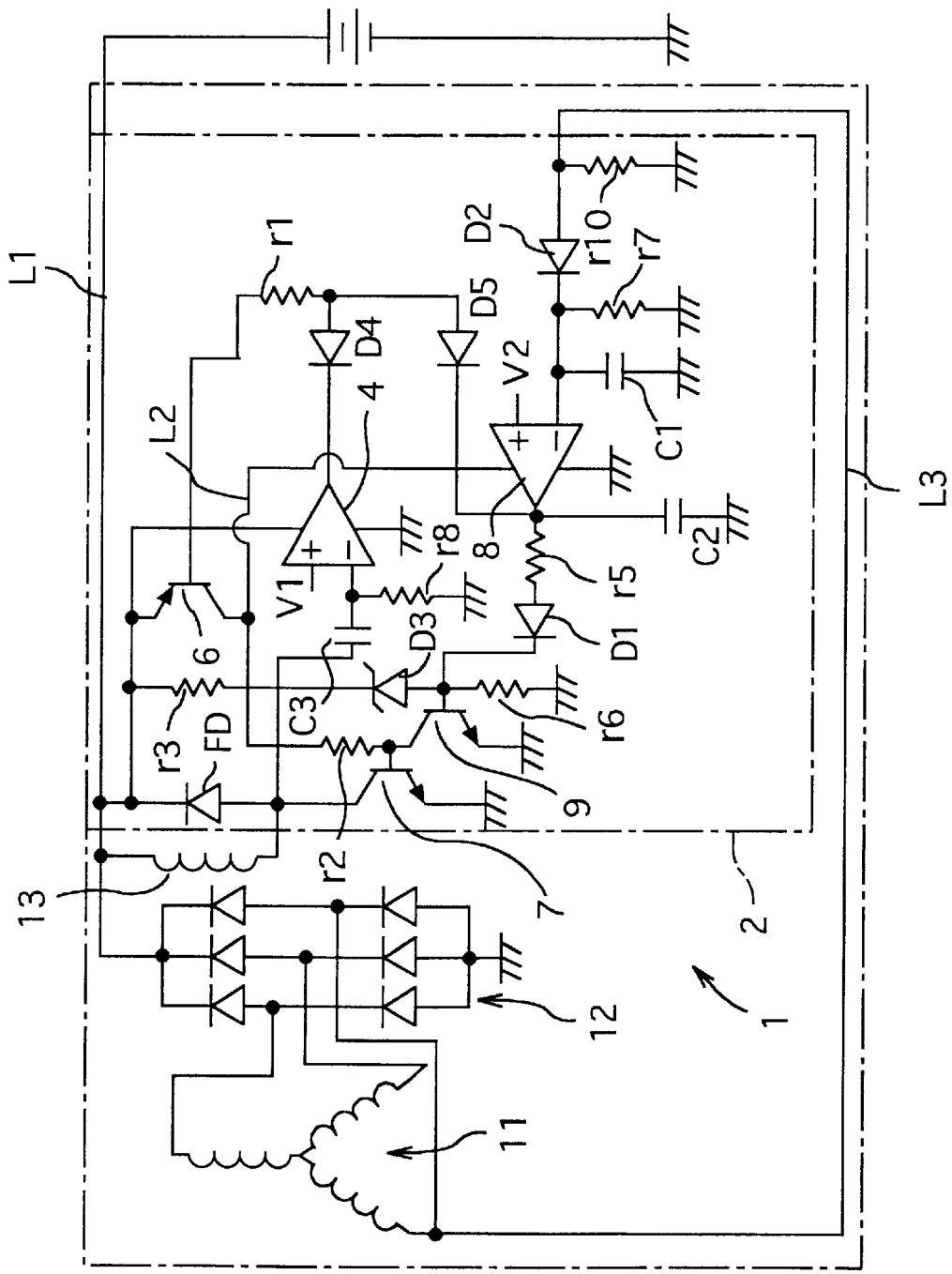
FIG. 2 is a circuit diagram of an AC generator that includes a voltage regulator according to a second embodiment of the invention.

A voltage regulator 2 according to a second embodiment of the invention is described with reference to FIG. 2. In the meantime, the same reference numeral in the following drawings indicates the same or substantially the same part or portion as the voltage regulator according to the first embodiment.

A set of the switching transistor 7, the pre-transistor 70 and the resistor r4 of the voltage regulator according to the first embodiment is substituted by a single switching transistor 7. A capacitor C3 is inserted between the field coil 13 and the negative terminal of the comparator 4 to insulate it from the battery voltage, and a resistor r8 is connected to the negative terminal of the comparator 4 to prevent it from floating. Other portions are the same as the voltage regulator according to the first embodiment. The capacitor C3 can be omitted if the minus terminal of the comparator 4 is biased to have the same voltage level as the battery.

The voltage regulator according to the second embodiment operates substantially in the same manner as the voltage regulator according to the first embodiment.

Figure 5:
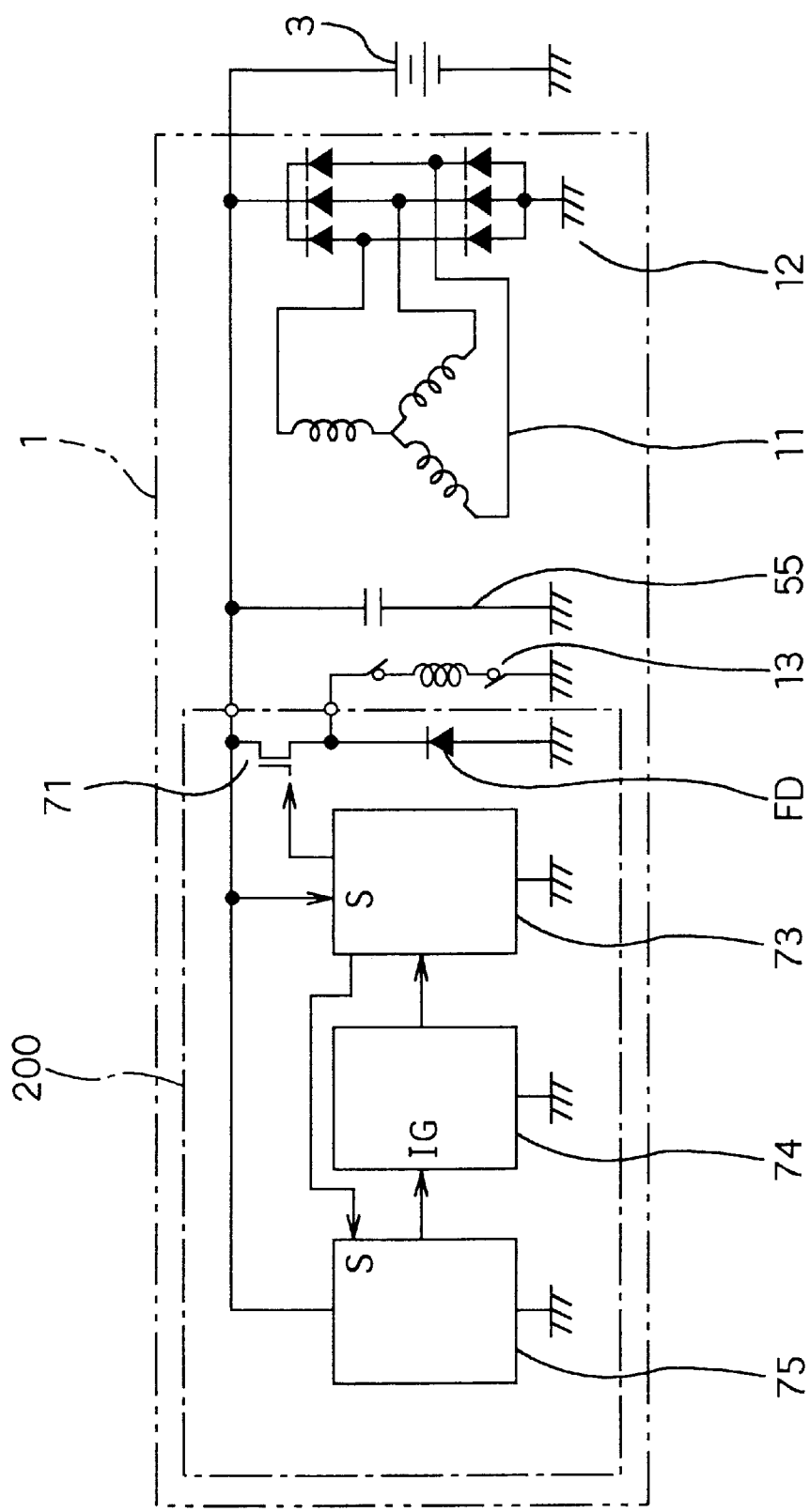
FIG. 5 is a circuit diagram of an AC generator that includes a voltage regulator according to a third embodiment of the invention.

A voltage regulator 200 according to a third embodiment of the invention is described with reference to FIGS. 5–7.

The vehicle AC generator 1 includes the three-phase armature coil 11, the three-phase full-wave rectifier 12, a field coil 13, a smoothing capacitor 55 and a voltage regulator 200 according to a third embodiment of the invention.

The voltage regulator 200 is comprised of a switching transistor 71, a flywheel diode FD, a transistor control circuit 73, a power circuit 74 and a power drive circuit 75. The switching transistor 71 corresponds to the switching transistor 7 of the voltage regulator according to the first embodiment, shown in FIG. 1.

The control circuit 73 includes a comparator that compares battery voltage with a reference voltage to control the switching transistor 71 +in a well-known manner. The control circuit 73 corresponds to the circuit that is comprised of the voltage dividing resistors r3 and r6, the Zener diode D3 and the transistor 9 of the voltage regulator shown in FIG. 1.

The power circuit 74 is a well-known circuit for supplying power to the control circuit 73. The power circuit 74 may be comprised of a constant voltage circuit or a circuit connecting an ignition terminal and the control circuit 73.

Figure 6:
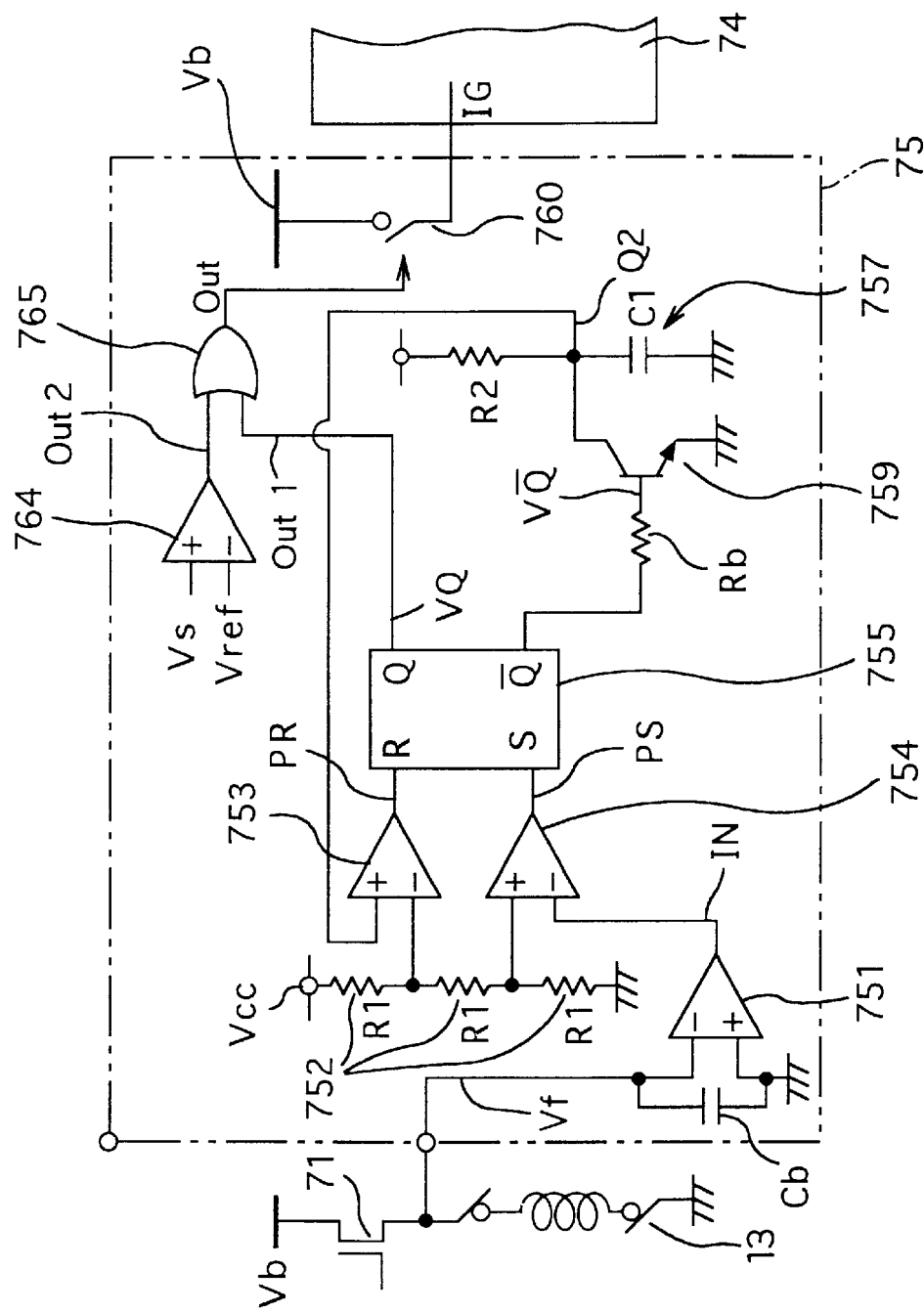
FIG. 6 is a circuit diagram of a portion of the voltage regulator according to the third embodiment.
Figure 7:
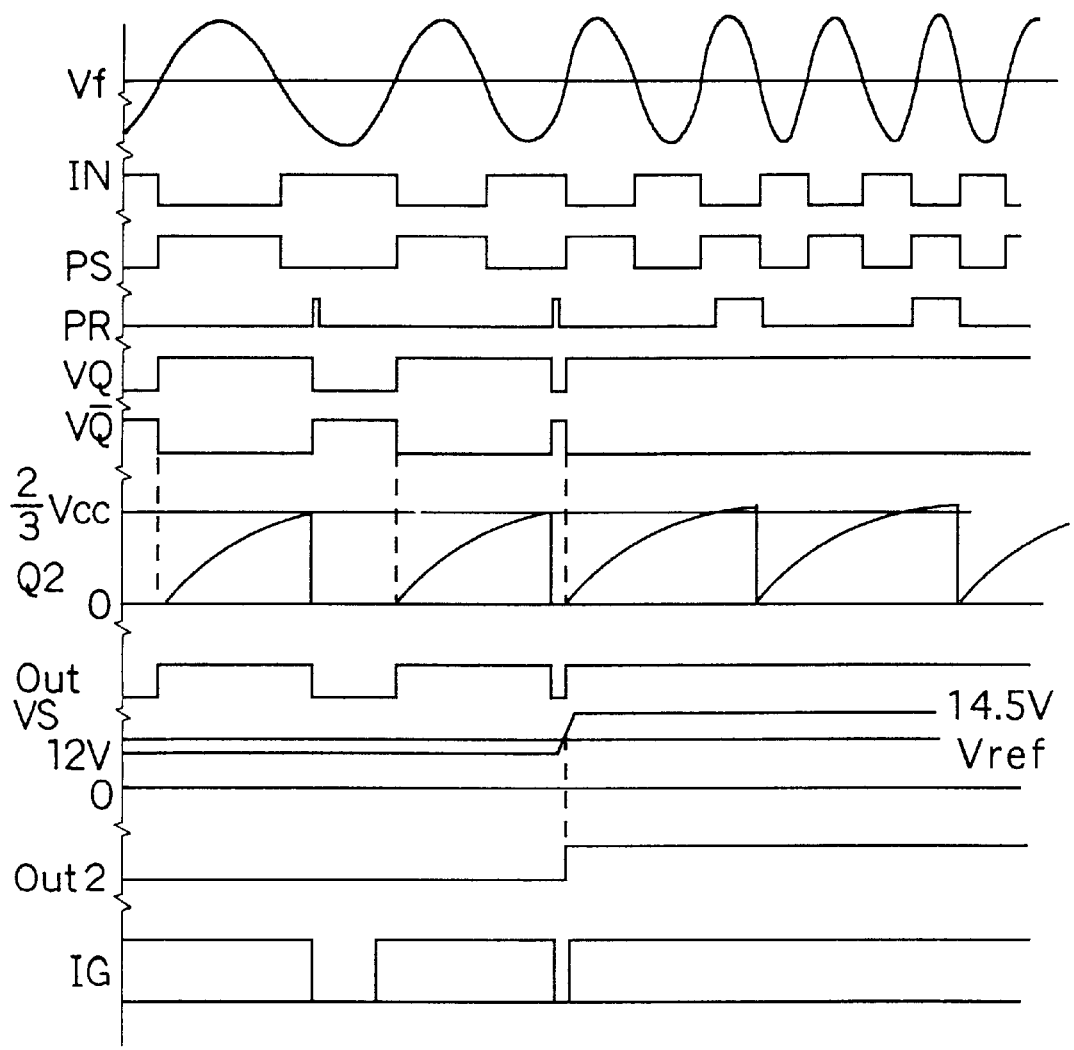
FIG. 7 is a timing chart showing voltage signals of various portions of the voltage regulator according to the third embodiment.
Figure 8:
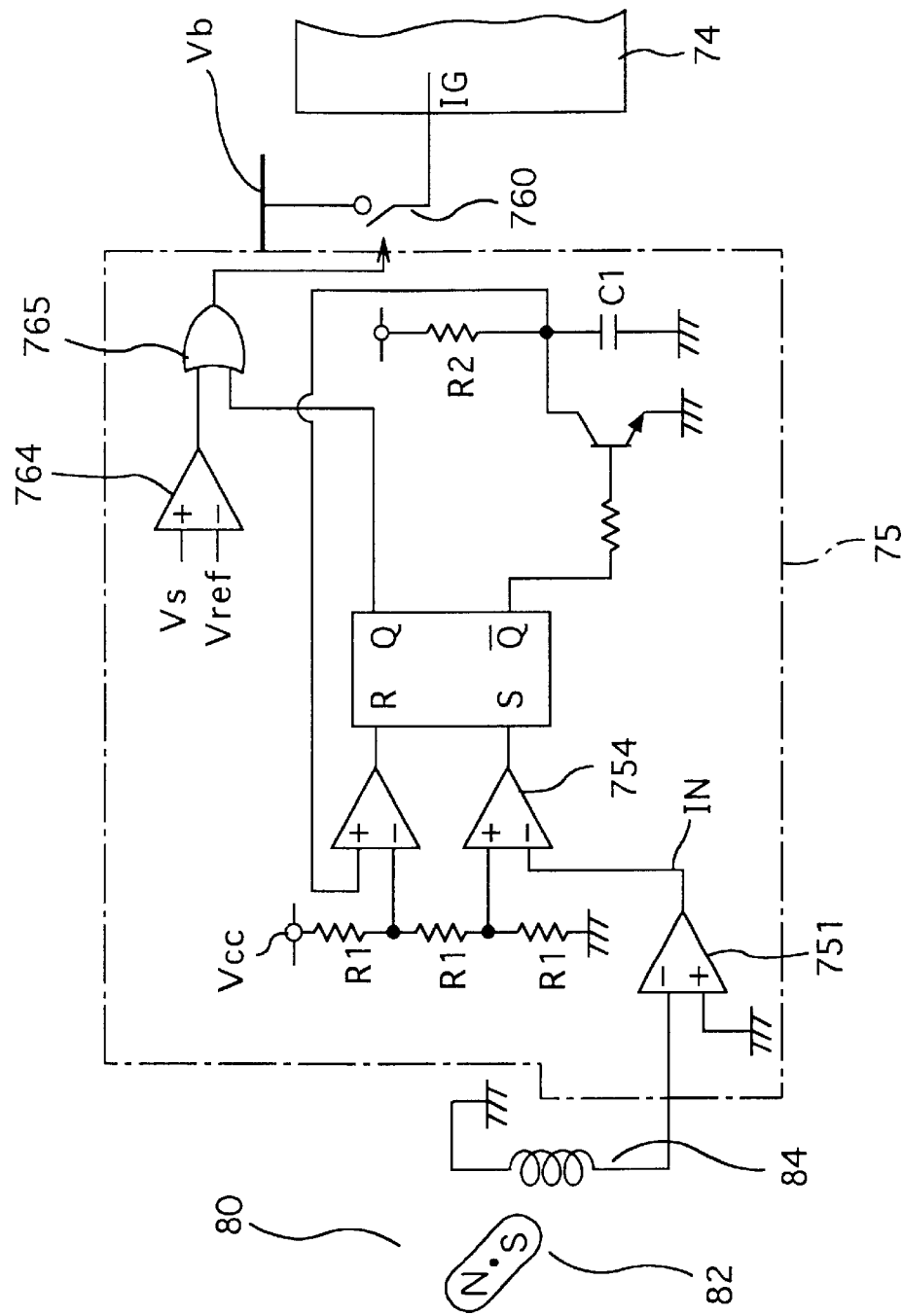
FIG. 8 is a circuit diagram of a portion of a voltage regulator according to a fourth embodiment of the invention.
Figure 9:
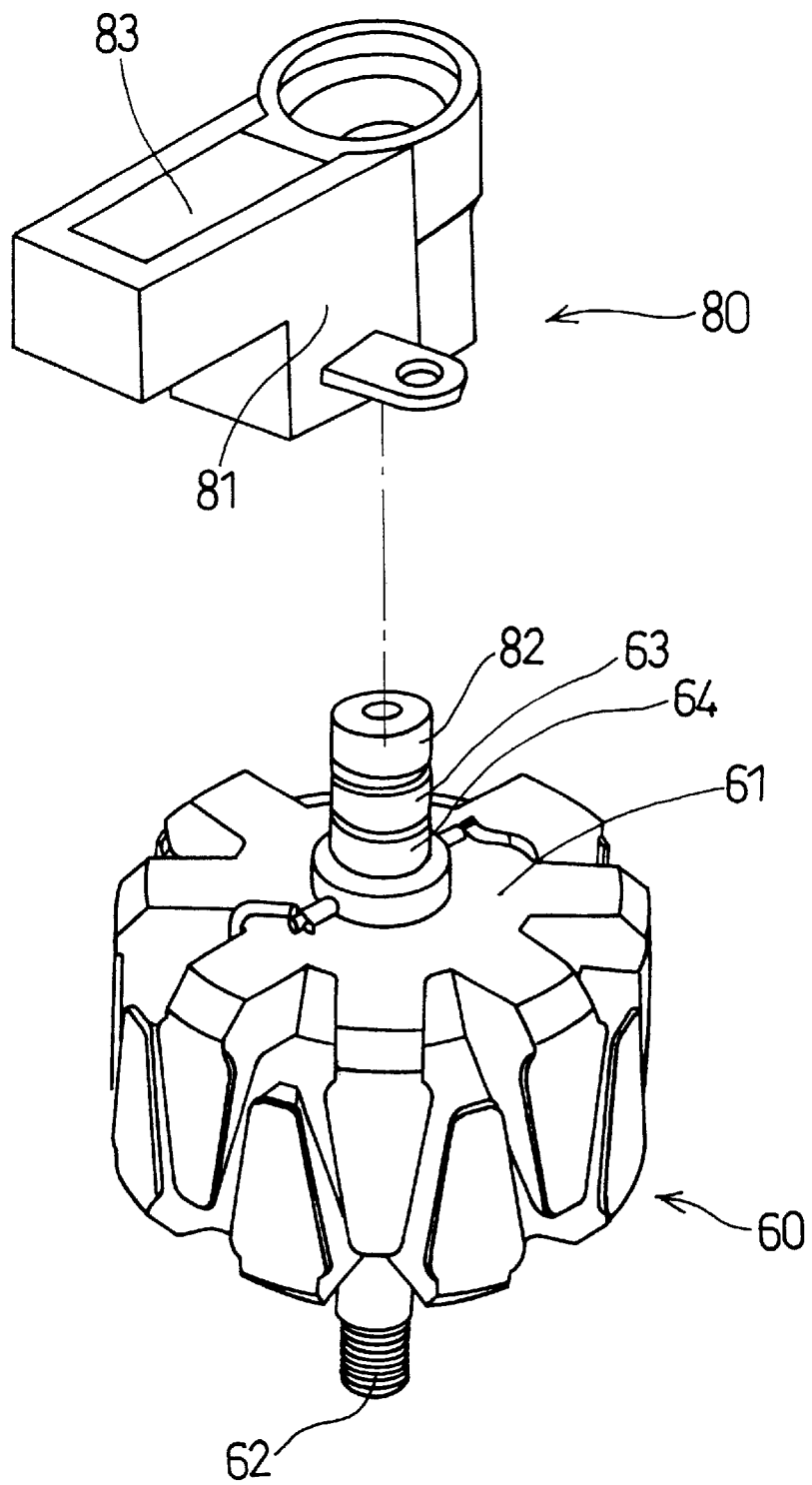
FIG. 9 is an exploded perspective view of a sensor shown in FIG. 8 and a rotor of an AC generator in which the voltage regulator is mounted.

The power drive circuit 75 is comprised of a first comparator 751, a voltage dividing circuit 752, a second stage comparator 753, a third comparator 754, an RS flip-flop circuit 755, a CR circuit 757, a transistor 759, an analog switch 760, a fourth comparator 764 and an OR circuit 765, as shown in FIG. 6.

The first comparator 751 compares the field voltage induced in the field coil 6 with a reference voltage Vref. A capacitor Cb is connected across the input terminals of the first comparator 751 to bypass high frequency noises. However, the field voltage Vf, whose frequency is low, is not attenuated by the capacitor Cb. The second comparator 753 compares the output voltage of the CR circuit 758 with a first reference voltage. The voltage dividing circuit 752 includes three resistors R1 that are connected in series between a power source that provides a constant voltage Vcc and a ground. However, the constant voltage may be substituted by a battery voltage. The second comparator 753 compares an output voltage of the CR circuit 758 with $\frac{2}{3}$ Vcc that is provided by the voltage dividing circuit 753. The third comparator 754 compares the output signal of the first comparator 751 with $\frac{1}{3}$ Vcc that is provided by the voltage dividing circuit 752. The RS flip-flop circuit 755 is connected to the second comparator 753 at the reset terminal thereof and to the third comparator 754 at the set terminal thereof. The CR circuit 757 is comprised of a series circuit of a capacitor C1 and a resistor R2. The CR circuit 757 may be substituted by a digital counter and the like. The inverted Q terminal of the RS flip-flop circuit 757 is connected through a resistor Rb to the base electrode of the transistor 759, which discharge the capacitor C1 when it is turned on. The fourth comparator 764 compares a divided voltage Vs of DC output voltage of the AC generator 1 with a second reference voltage Vref. Input terminals of the OR circuit 765 are respectively connected to the Q terminal of the flip-flop circuit 755 and the output terminal of the fourth comparator 764. The analog switch 760 is driven by the output signal of the OR circuit 765 and supply electric power to the IG terminal of the power circuit 74. The analog switch 760 corresponds to the transistor 6 shown in FIG. 1.

Operation of the power drive circuit 75 is described with reference to FIG. 7.

If the rotor of the AC generator 1 rotates, a self-excited field voltage Vf, such as 0.2–0.4 V, is induced in the field coil 13 because of their residual magnetic flux. The frequency of the field voltage Vf is expressed as follows: P1·N/60 [Hz], wherein 2P1 is the number of poles of the rotor of the AC generator, and N is the number of revolutions of the rotor per minute.

The first comparator 751 compares the AC voltage of the field winding 13 with the first reference voltage, such as a ground voltage, to provide a rectangular voltage signal IN whose duty ratio is 50% and frequency is P1·N/60. The rectangular voltage signal IN is compared by the third comparator 754 with the divided voltage Vcc/3 to provide a signal to be applied to the set terminal of the flip-flop circuit 755.

The second comparator 753 compares the output signal of the CR circuit 757 with the divided voltage 2·Vcc/3 and provides Hi-signal to reset the flip-flop circuit 755 if the output signal of the CR circuit 757 becomes as high as the divided voltage 2·Vcc/3.

If the output signal of the CR circuit 758 is lower than the divided voltage 2·Vcc/3, the second comparator 753 provides low-signal. The flip-flop circuit 755 provides Hi-signal at the Q terminal and Lo-signal at the inverted Q terminal. Accordingly, the transistor 759 is turned off, and the capacitor C1 is charged. When the capacitor C1 is charged so that the capacitor voltage Vc becomes as high as 2·Vcc/3, the flip-flop circuit 755 is reset to turn on the transistor 759.

Consequently, the capacitor C1 is discharged. In other words, the flip-flop circuit 755 provides Hi-signal at the Q terminal for a fixed duration that corresponds to the time constant of the CR circuit 758. As long as the Q terminal of the flip-flop circuit 757 provides Hi-signal, the analog switch 760 is maintained to be on to operate the power circuit 74.

If the rotor rotates at a low speed, the fixed duration provided by the CR circuit 758 is shorter than the duration of the signal on the set terminal of the flip-flop circuit 757.

Therefore, Lo-signal is provided on the set terminal until the capacitor voltage becomes as high as 2·Vcc/3 to reset the flip-flop circuit 757. Accordingly, the signal Out of the Q terminal of the flip-flop circuit 757 maintains Lo-signal, and the output signal of the power drive circuit 75 maintains Lo-signal.

If the rotor rotates at a speed higher than a predetermined speed, the duration of the signal applied to the set terminal of the flip-flop circuit 755 becomes shorter than the fixed duration provided by the CR circuit 757. Accordingly, the signal on the set terminal of the flip-flop circuit 755 is Hi-signal when the capacitor voltage becomes as high as 2·Vcc/3, thereby, to reset the flip-flop circuit 755. Therefore, the flip-flop circuit 755 maintains Hi-signal at the Q terminal, and the power drive circuit 75 maintains Hi-signal as its output signal Out. In other words, the frequency of the field voltage becomes higher as the rotation speed of the rotor becomes higher, and the duration in which the output signal Out is cut off becomes shorter and shorter until it is continuously provided to always operate the power circuit 74.

For example, it is possible to continuously operate the power circuit of an AC generator having a twelve-pole rotor at the rotation speed of 1000 rpm if: R2 is 100 kΩ; and C1 is 0.1 μF. Generally, it is possible to continuously operate the power circuit of an AC generator having a 2·P1-pole rotor at a speed N1 rpm if the time constant of the CR circuit 757 is 60/(P1·N1) sec.

The fourth comparator 764 provides Hi-signal as a signal Out2 if the battery voltage is higher than the second reference voltage Vref2 that corresponds to a no-load battery voltage, e.g. 13 V. The OR circuit 765 provides the signal Out having sufficient power to drive the analog switch 760 even if the flip-flop circuit 755 can not provide sufficient power at the Q terminal when Hi-signal is applied to both the set and reset terminals.

When the key switch is turned off and the engine is stopped, the battery voltage gradually lowers to a voltage lower than 13 V, e.g. 12.8V. Consequently, the comparator 761 changes the output signal from Hi-signal to Lo-signal to turn off the analog switch 760, thereby stopping the operation of the power circuit 74. It takes scores of seconds to completely stop supply of the field current. This gradually-decreasing field current demagnetizes the armature core to make the voltage regulator stand ready. Instead of the battery voltage, the frequency or AC voltage of the phase-windings can be used for the above purpose. FIG. 7 shows voltage levels on various portions of the power drive circuit 75.

A voltage regulator according to a fourth embodiment of the invention is described with reference to FIGS. 8–11.

The voltage regulator according to the fourth embodiment includes a rotation sensor 80 that is substituted for the sensing circuit of the field voltage Vf shown in FIG. 6.

The rotation sensor 80 is comprised of a resinous holder 81, a cylindrical permanent magnet rotor 82 fixed to the main rotor 60 of the AC generator and a pickup coil 84 disposed in a cavity 83 of the holder 81.

The main rotor 60 is a well-known type rotor comprised of a magnetic core 61 having a plurality of claw poles, a shaft 62 and a pair of slip rings 63 and 64.

Figure 10:
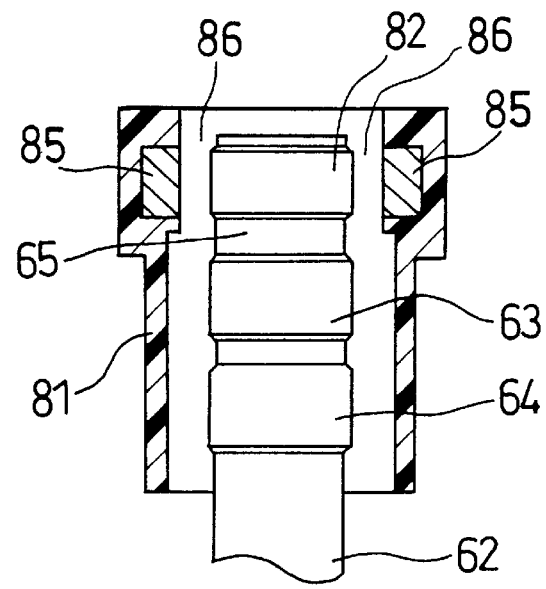
FIG. 10 is a cross-sectional view of the sensor shown in FIG. 9.
Figure 11:
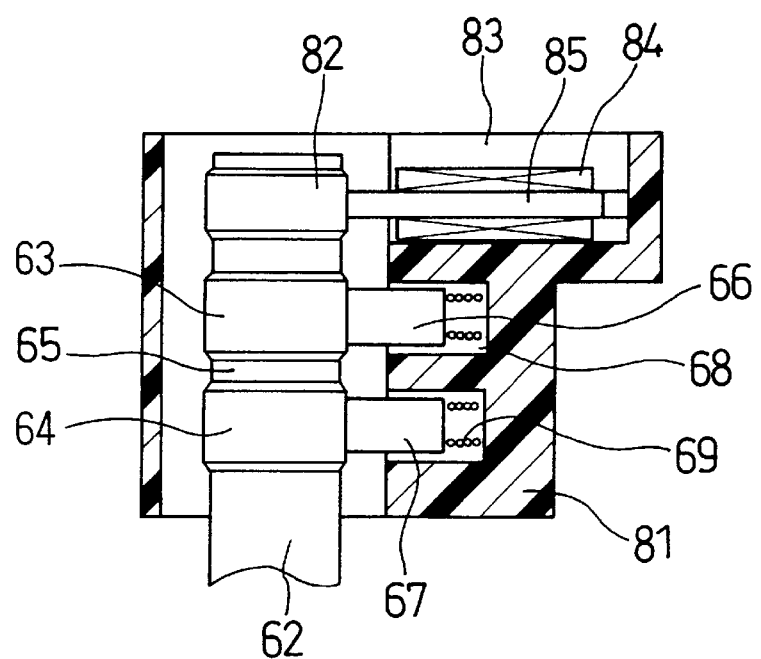
FIG. 11 is another cross-sectional view of the sensor shown in FIG. 9.

The resinous holder 81 has a through hole in which the permanent magnet rotor 82, the pair of slip rings 63 and 64 are disposed as shown in FIGS. 10 and 11. The holder 81 also holds a pair of brushes disposed in contact with the pair of slip rings 63 and 64, which are respectively biased by coil springs 68 and 69 in a well-known manner.

The pickup coil 84 is wound around a C-shaped iron core 85 extending around the through hole opposite the permanent magnet rotor 82. The opposite ends of the iron core 85 are disposed at the inner surface of the through hole spaced apart from each other. The distance between the opposite ends is a pole-pitch of the permanent magnet rotor 82. The cavity 83 is sealed by resinous material to protect the pickup coil 84. The pickup coil 84 can be substituted by other sensor such as a Hole element or another semiconductor magnetic sensor.

The operation of the power drive circuit 75 is substantially the same as the power drive circuit of the voltage regulator according to the third embodiment.

Figure 12:
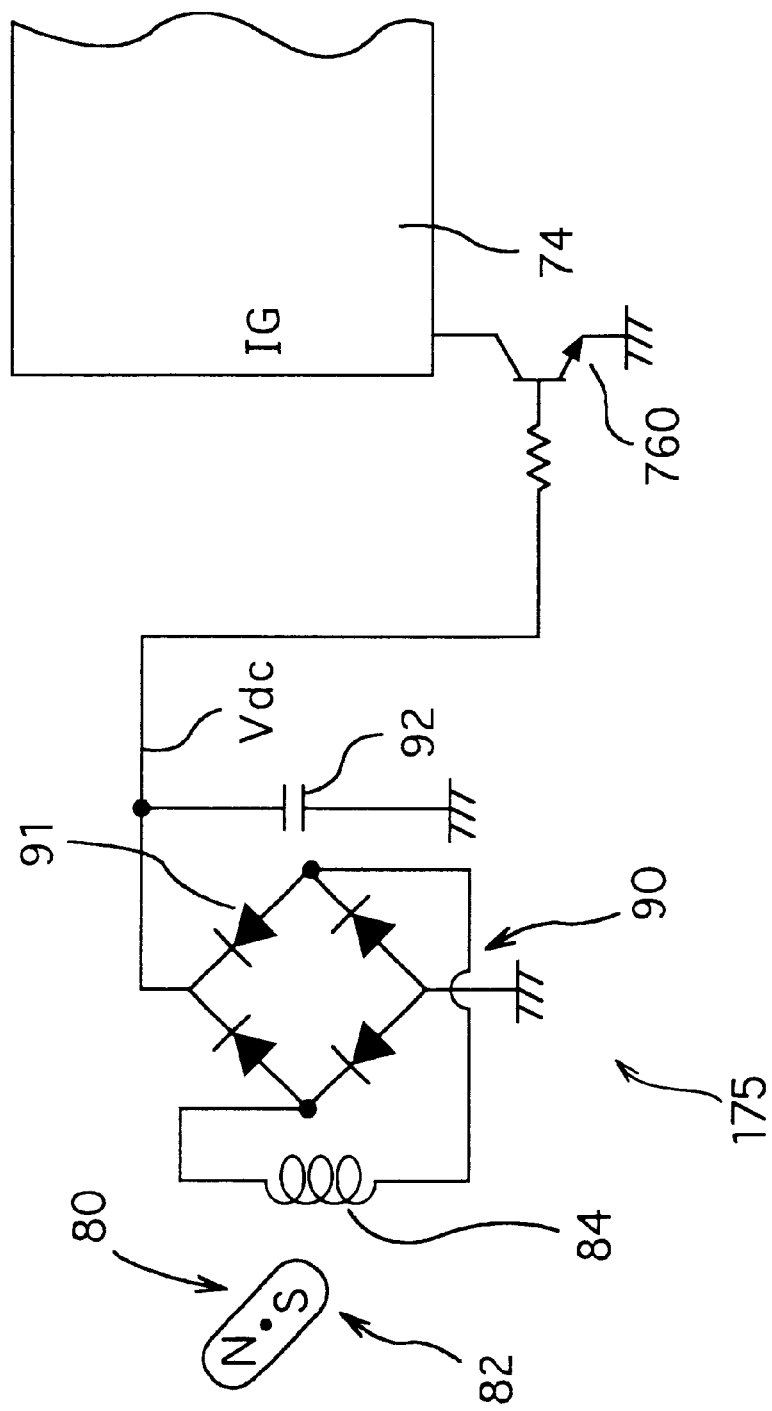
FIG. 12 is a circuit diagram of a portion of the voltage regulator according to a fifth embodiment of the invention.

A voltage regulator according to a fifth embodiment of the invention is described with reference to FIG. 12.

The power drive circuit 175 of the voltage regulator according to the fifth embodiment of the invention is comprised of the rotation sensor 80 that was described above, a rectifier circuit 90 for rectifying the output voltage of the rotation sensor 80 and the analog switch 760. The rectifier circuit 90 is comprised of a single-phase full-wave bridge circuit 91 and a smoothing capacitor 92. The output signal Vdc of the rectifier circuit 90 is applied to the analog switch 760 through a buffer circuit (not shown). If the rotor rotates at a speed N1, the output signal Vdc turns on the switch 760, so that the voltage regulator can automatically operate to make the AC generator start regular operation.

Therefore, the voltage regulator is very simple and effectively saves battery power.

Figure 13:
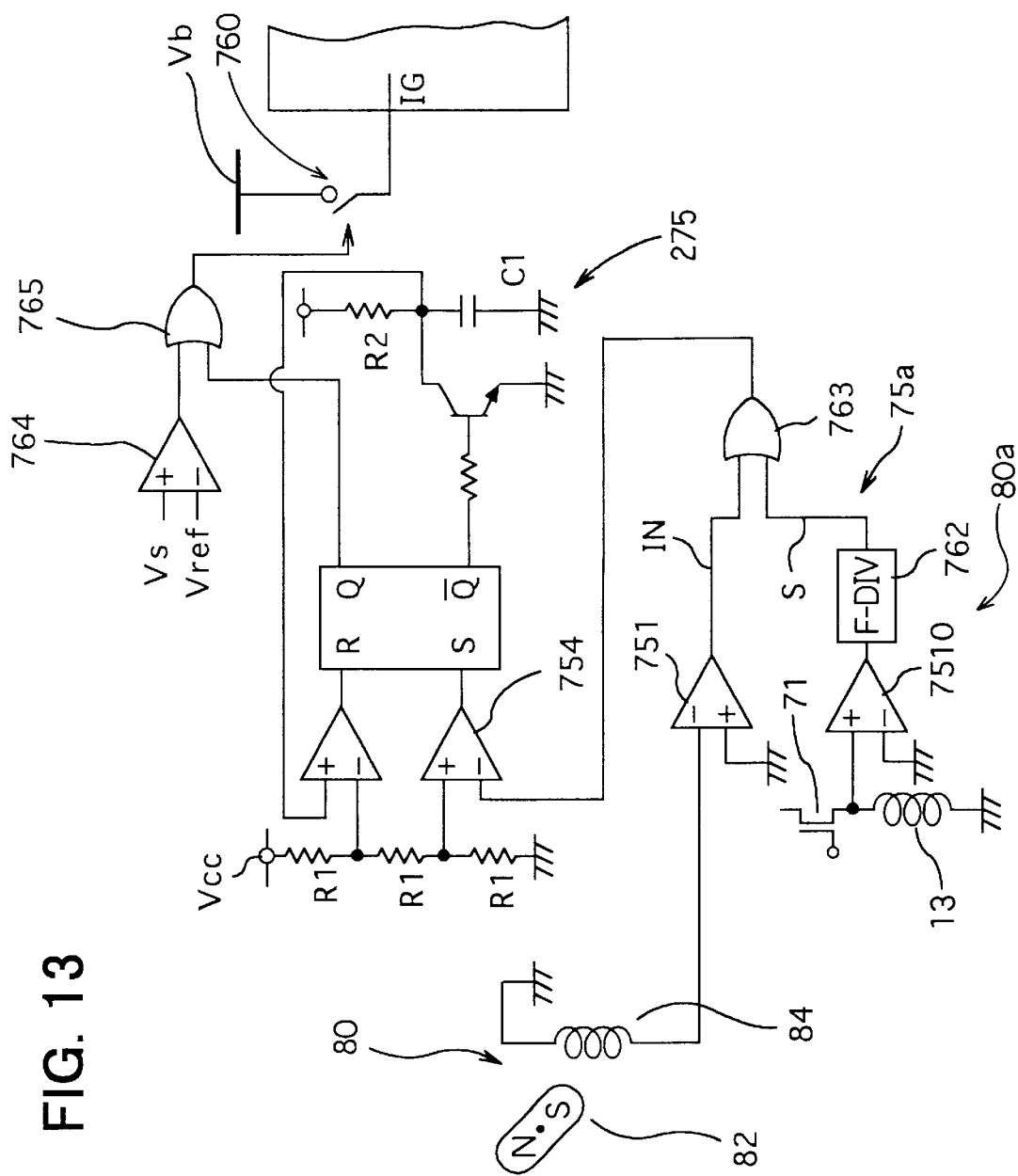
FIG. 13 is a circuit diagram of a portion of a voltage regulator according to a sixth embodiment of the invention.

A voltage regulator according to a sixth embodiment of the invention is described with reference to FIG. 13.

The power drive circuit 275 of the voltage regulator according to the sixth embodiment is provided with two sensor circuits, the rotation sensor 80 shown in FIGS. 8–11 and the field voltage sensor circuit 80*a* that is substantially the same as shown in FIG. 1 or 6. The two sensor circuits 80 and 80*a* are connected to the comparator 754 via an OR circuit 763.

The field voltage sensor circuit 80*a* is comprised of a comparator 7510 that is connected to the field coil 13, a frequency dividing circuit 762. The comparator 7510 converts the field voltage Vf into a binary signal, and the frequency dividing circuit 762 divides the frequency of the binary signal into a suitable frequencies to match the frequencies of the output signal of the comparator 751. The frequency dividing circuit 762 can be omitted if the permanent magnet rotor 82 has the same number of magnetic poles as the claw poles of the AC generator.

The power drive circuit 75 of this embodiment operates more accurately than the above described circuits 75 because it can detect two independent physical values.

Figure 14:
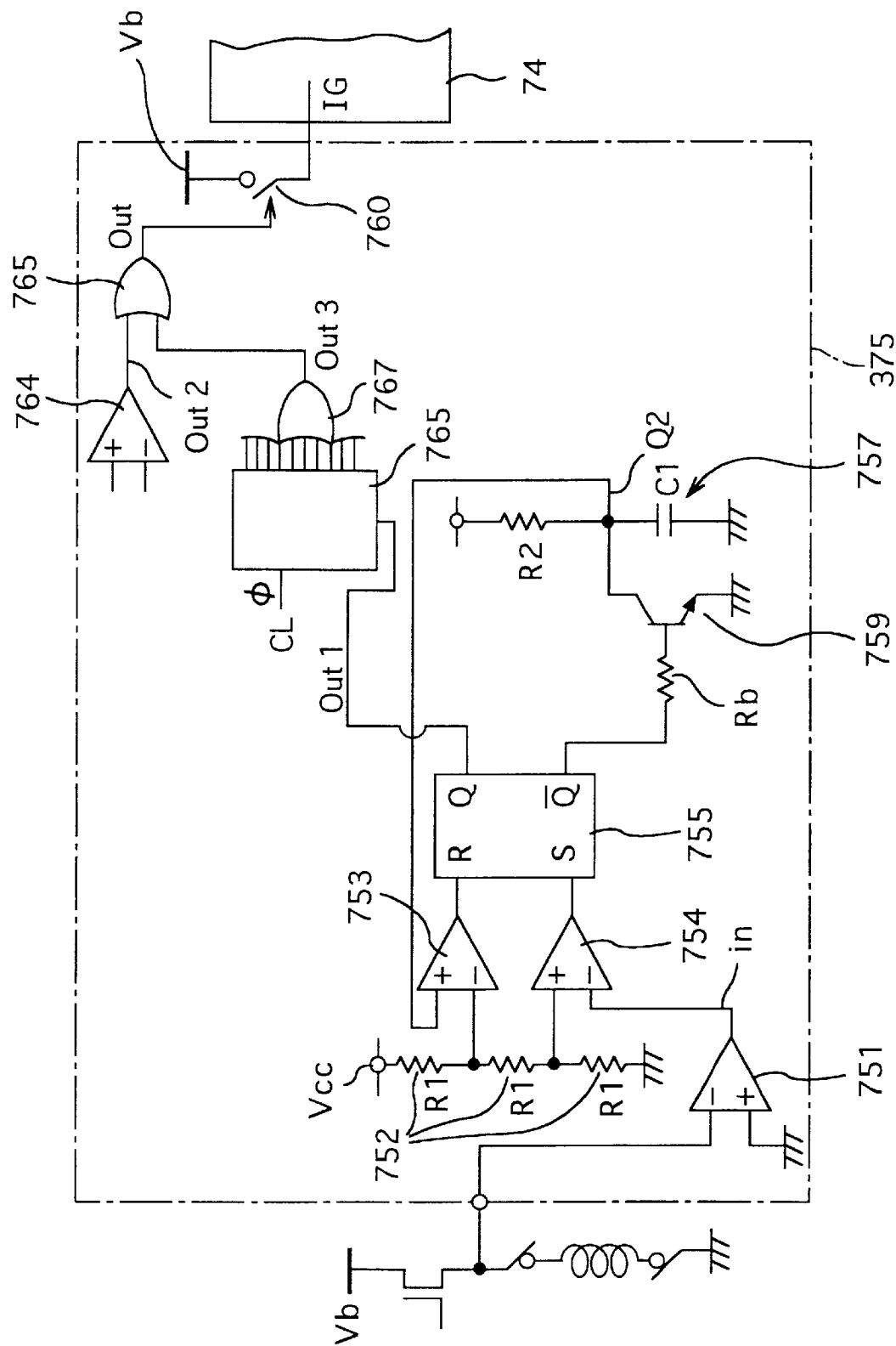
FIG. 14 is a circuit diagram of a portion of a voltage regulator according to a seventh embodiment of the invention.
Figure 15:
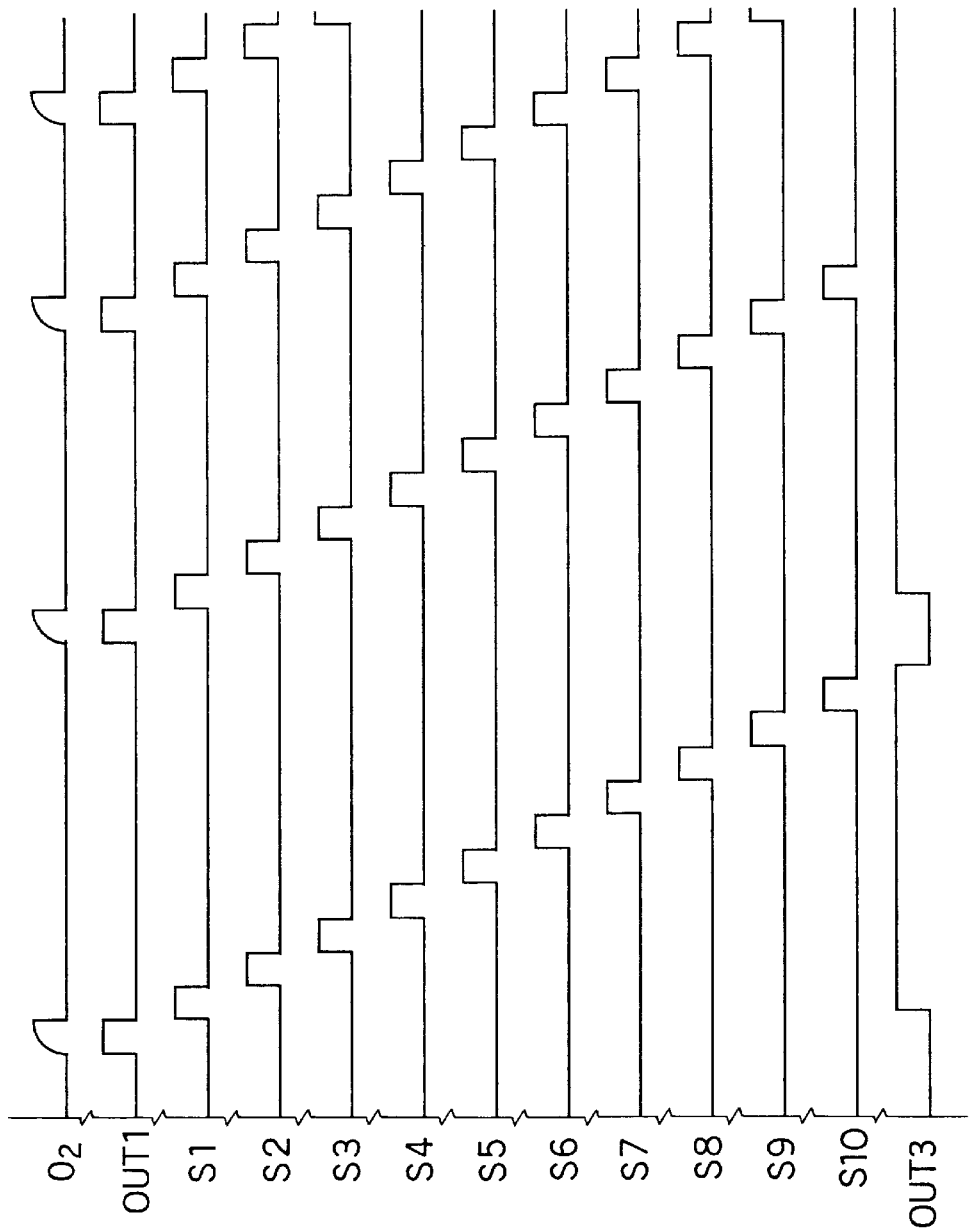
FIG. 15 is a timing chart showing voltage signals of various portions of the voltage regulator according to the seventh embodiment.

A voltage regulator according to a seventh embodiment of the invention is described with reference to FIGS. 14 and 15. The voltage regulator according to the seventh embodiment of the invention is provided with a power drive circuit 375.

The power drive circuit 375 has a 10-staged shift register 765 and an OR circuit 767. The 10-staged shift register 765 and the OR circuit 767 are inserted between the Q terminal of the RS flip-flop circuit 755 and the OR circuit 765 of the power drive circuit 75 of the third embodiment shown in FIG. 6.

The capacity of the capacitor C1 is reduced to about 1/10 of the capacity of the capacitor C1 shown in FIG. 6. Therefore, the duration of the Hi-signal of the terminal Q2 of the CR circuit 757 is reduced to 1/10 of the duration of the Hi-signal of the terminal Q2 shown in FIG. 6.

The output terminals of 10-staged shift register 765 are connected to the input terminals of the OR circuit 767. As long as the shift register 765 shifts the Hi-signal over the stages, the OR circuit 767 provides Hi-signal, as shown in FIG. 15. In FIG. 15, reference characters S1, S2 S10 indicate output terminals of the respective stages of the shift register 765.

If the frequency φ of the clock signal CL that is applied to the shift register 65 is set about 1/CR, the OR circuit 767 provides the Hi-signal whose duration is approximately the same as the Hi-signal duration of the output signal Out 1 of the flip-flop circuit 755 shown in FIG. 6. If an n-staged shift resister is used, the capacity of the capacitor C1 can be reduced to 1/n of the capacitor C1 shown in FIG. 6. The OR circuits 765 and 767 can be formed into a single OR circuit.

Instead of the shift register 765, a digital circuit that includes a counter can be substituted. The digital circuit provides Hi-signal when the signal Out 1 is Hi-signal, and the counter counts a fixed number of the hi-signals. Thereafter, the digital circuit provides Lo-signal whose duration is equal to the time during which the counter counts.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A voltage regulator of a vehicle AC generator including a rotor having a field coil and a plurality of magnetic poles and a stator having a stator core and an armature coil, said voltage regulator comprising:

a switching circuit, connected to said field coil, for supplying field current to said field coil in a controlled manner;

a field voltage detecting circuit for detecting a residual field voltage induced in said field coil when said field coil is not supplied with field current; and a switch control circuit, connected to said field voltage detecting circuit, for controlling said switching circuit according to said field voltage.

2. The voltage regulator as claimed in claim 1, wherein said field voltage detecting circuit comprises first means for providing said field voltage induced by residual magnetic flux of said stator core.

3. The voltage regulator as claimed in claim 1 wherein, said switch control circuit comprises a second means for turning on said switching circuit when one of the frequency and voltage of said field voltage becomes as high as a predetermined value.

4. The voltage regulator as claimed in claim 2, wherein said switch control circuit controls said switching circuit to regulate an output voltage of said AC generator when one of the frequency and voltage of said field voltage becomes as high as a predetermined value.

5. A voltage regulator of a vehicle AC generator including a rotor having a field coil and a plurality of magnetic poles and a stator having a stator core and an armature coil, said voltage regulator comprising:

a field current switching circuit connected to said field coil;

a field voltage detecting circuit for detecting a residual field voltage induced in said field coil when said field coil is not supplied with field current;

a control circuit, connected to said field voltage detecting circuit, for controlling said field current switching circuit according to an output voltage of said armature coil;

a power circuit for supplying electric power to said control circuit;

a power drive circuit for controlling supply of said electric power to said control circuit; and first means for detecting rotation speed of said rotor according to said field voltage, wherein said power drive circuit supplies electric power from said power circuit to said control circuit if said rotation speed becomes as high as a predetermined speed.

6. The voltage regulator as claimed in claim 5, wherein said first means comprises said field coil and second means for detecting field voltage induced in said field coil by residual magnetic flux of said stator core; and said power drive circuit supplies electric power from said power circuit to said control circuit for a predetermined duration after said field voltage becomes as high as a predetermined voltage.

7. The voltage regulator as claimed in claim 6, wherein said power drive circuit further comprises a switch element for supplying electric power from a battery to said power circuit.

8. A voltage regulator of a vehicle AC generator including a rotor having a field coil and a plurality of magnetic poles and a stator having a stator core and an armature coil, said voltage regulator comprising:

a switching circuit for supplying field current to said field coil in a controlled manner;

means for detecting rotation speed of said rotor according to a residual voltage induced in said field coil when said field coil is not supplied with field current; and a switch control circuit, connected to said means, for providing said switching circuit with electric power to be supplied to said field coil when said detected rotation speed becomes as high as a predetermined speed.

* * * * *